United States Patent [19]

Enayati

[11] Patent Number: 5,388,873

[45] Date of Patent: Feb. 14, 1995

[54] COUPLING DEVICE USEFUL FOR JOINING OR CAPPING PLASTIC PIPE

[75] Inventor: Siavoosh K. Enayati, San Mateo, Calif.

[73] Assignee: Metcal, Inc., Menlo Park, Calif.

[21] Appl. No.: 77,992

[22] Filed: Jun. 18, 1993

[51] Int. Cl.⁶ .......................................... F16L 33/207
[52] U.S. Cl. ................................. 285/256; 285/331;
285/350; 285/906; 285/94; 285/371
[58] Field of Search ............... 285/350, 242, 901, 243,
285/256, 331, 371, 901, 94

[56] References Cited

U.S. PATENT DOCUMENTS

| | | | |
|---|---|---|---|
| 646,590 | 4/1900 | Williams | 285/350 |
| 1,184,484 | 5/1916 | Muller | 285/350 X |
| 2,424,863 | 7/1947 | Swain | 285/242 X |
| 3,004,780 | 10/1961 | Main | 285/242 |
| 3,877,735 | 4/1975 | Demler, Sr. | . |
| 3,908,261 | 9/1975 | Demler, Sr. | . |
| 4,923,221 | 5/1990 | Taylor | 285/901 X |
| 5,131,687 | 7/1992 | Marchow | 285/242 X |

FOREIGN PATENT DOCUMENTS

| | | | |
|---|---|---|---|
| 215500 | 1/1957 | Australia | 285/242 |
| 70353 | 4/1959 | France | 285/242 |
| 835381 | 3/1952 | Germany | 285/242 |
| 3836124 | 5/1990 | Germany | 285/242 |

*Primary Examiner*—Dave W. Arola
*Attorney, Agent, or Firm*—Burns, Doane, Swecker, & Mathis

[57] ABSTRACT

A coupling device for joining ends of pipes together or capping an end of a single pipe. The device includes a metal insert having serrations for engaging an inner surface of a plastic pipe, a deformable coupling member which overlies the pipe and a metal ring of smaller inner diameter than the outer diameter of the coupling member for compressing the coupling member and plastic pipe against the metal insert. A space forming feature reduces the insertion force required to slide the metal ring over the coupling member. For instance, the metal insert can include a circumferentially extending groove on an outer surface to accommodate flow of the plastic pipe as it is deformed by the metal ring. Alternatively, the coupling member can include a recess, groove or projection, the inner surface of the coupling member can be tapered, the end of the plastic pipe can be tapered or a compressible member or a ball bearing can be inserted between the end of the pipe and the coupling member to accomplish the same result.

26 Claims, 7 Drawing Sheets

COUPLING DEVICE USEFUL FOR JOINING OR CAPPING PLASTIC PIPE

FIELD OF THE INVENTION

The invention relates to improvements in mechanical coupling devices for joining or capping plastic pipe.

BACKGROUND OF THE INVENTION

A coupling device for joining plastic pipe is disclosed in U.S. Pat. No. 3,877,735, the disclosure of which is hereby incorporated by reference. U.S. Pat. No. 3,908,261 also discloses the coupling device in the '735 patent. The coupling device disclosed in the '735 and '261 patents includes a pair of tubular insert members which are inserted into opposed ends of plastic pipe sections, a pair of semi-circular retaining clips which fit over abutting flanges of the insert members, a tubular coupling member which fits over the outer surfaces of the pipe sections and a pair of rigid rings which slide toward each other and over the outer surface of the coupling member to plastically deform the inside of the plastic pipe sections into interlocking relationship with serrations on the outer surfaces of the insert members. The inserts, clips and rigid rings are formed of metal and the coupling member is made of a deformable plastic.

The coupling member described above suffers certain drawbacks. For instance, when the rigid rings are pressed toward each other to complete the coupling, the direction of plastic flow of the plastic pipe sections is the same as the rigid ring motion. That is, the plastic pipe sections tend to flow toward each other. However, due to lack of free space between the ends of the pipe sections and the retaining clips, a large force is required to slide the rigid rings toward each other. That is, since there is no free space to accommodate flow of the plastic pipe sections, a large insertion force is necessary to compress the deformable coupling member and deform the plastic pipe between the rigid rings and the insert members. The worst side effect of this design is the phenomenon called "bunching" and excessive ring stress could lead to corrosion failure of the coupling. Accordingly, there is a need in the art for a coupling member which avoids the disadvantages of the prior art coupling.

SUMMARY OF THE INVENTION

The invention provides a coupling device useful for capping an end of a plastic pipe or joining two or more plastic pipes in fluid communication with each other. The device includes an insert, coupling means, a ring and spacer means. The insert fits inside an end of a plastic pipe. The coupling means surrounds the end of the plastic pipe and overlies the insert. The ring has a smaller inner diameter than the outer diameter of the coupling means and is adapted to fit over the coupling means and press the plastic pipe between the coupling means and the insert. The spacer means allows plastic flow of the end of the plastic pipe when the ring is fitted over the coupling means. In a preferred embodiment, the coupling means comprises a cup shaped tubular member which is open only at one end and sealed at an opposite end thereof for capping an end of a plastic pipe. In another embodiment, the coupling means comprises a tube which is open at opposite ends thereof with an axially extending continuous passageway extending between the opposite ends.

According to various aspects of the invention, the spacer means can comprise a recess in an outer surface of the insert or on an inner surface of the coupling means. For instance, the recess can comprise a continuous groove or plurality of depressions on an inner surface of the coupling means. Alternatively, the spacer means can comprise a projection on an inner surface of the coupling means and the projection can have various shapes such as a tapered or semi-circular shape. The spacer means can also comprise a tapered inner surface of the coupling means, a tapered surface of the end of the plastic pipe or a ball bearing, a compressible member or other suitable device which fits between the outer surface of the insert means and the inner surface of the coupling means.

When the coupling device is used for joining two or more plastic pipes in fluid communication with each other, the device includes an insert, a coupling member, rigid rings and spacer means. The insert can include serrations on an outer surface thereof and sections of the insert are adapted for being received into open ends of the pipes. The coupling member includes portions encircling the insert and the pipe ends. The rigid rings have passageways therethrough and the passageways are smaller in diameter than mating portions of the coupling member. The rings are adapted to be slid on the coupling member whereby the serrations on the insert member are compressibly engaged with the interior surfaces of the plastic pipes and the pipes are coupled to the insert member, the coupling member and the rings.

DETAILED DESCRIPTION OF THE PREFERRED EMBODIMENTS

The invention provides a coupling device for connecting two sections of plastic pipe or capping a single section of plastic pipe. The coupling device includes spacer means to accommodate flow of the plastic pipe during assembly of the coupling device. The spacer means reduces the installation force required to assemble the coupling device, reduces the operating stress on the outer ring and eliminates bunching of the plastic pipe being joined or capped. Further, the spacer means allows the density of the uncompressed plastic pipe to remain constant under compression of ribs provided on the coupling member.

The coupling device of the invention includes an insert preferably of metal which fits within an end section of a plastic pipe to be joined or capped. The coupling device further includes a coupling member preferably of deformable plastic which surrounds the outer surface of the plastic pipe and a ring preferably of metal which surrounds the plastic pipe and coupling member in a manner such that when the ring is slid over the coupling member it compresses the coupling member and plastic pipe against the insert to provide a mechanical connection therebetween. The ring can be made of stainless steel such as 316 stainless steel which has been passivated to remove any impurities on the surface of the stainless steel ring. The coupling member can be molded from nylon such as Dupont Zytel ST-801 BK-10. The ST-801 resin has been found to have excellent moisture stability and cold temperature impact capabilities. The nylon can be used in the natural (white) condition or in the black form for improved UV stability. The insert can be of low carbon steel such as AISI-SAE 1008 to 1023 and can be tin plated. The steel ring has a typical carbon content of 0.08–0.23% and can be formed by drawing cold-rolled steel over a mandrel to form the desired pattern of serrations on one surface thereof and then welded to form tubing. The tubing can be tin plated to have a tin plated type one matte finish MIL-T10727B. The ring can be a deep-drawn stamping from 316 stainless steel sheet and can be passivated per MIL-P-35B TYP 11, medium temperature. The ring can then be coated with paraffin for lubricity. The insert can include one or more radially extending holes therethrough and the coupling member can be molded on the insert such that the resin extends into the holes. The end of the plastic pipe fits in a space between the outer surface of the insert and an inner surface of the coupling member.

Figure 1:
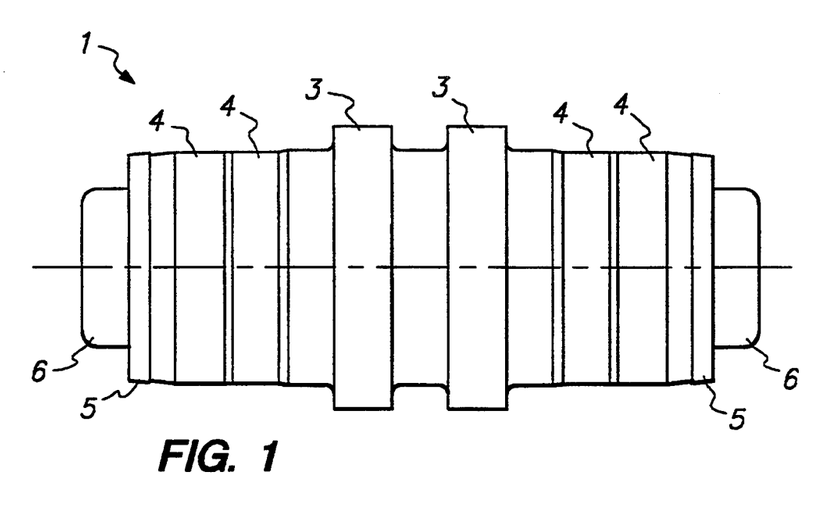
FIG. 1 shows a perspective view of a coupling member in accordance with the invention useful for joining end sections of plastic pipe together.
Figure 2:
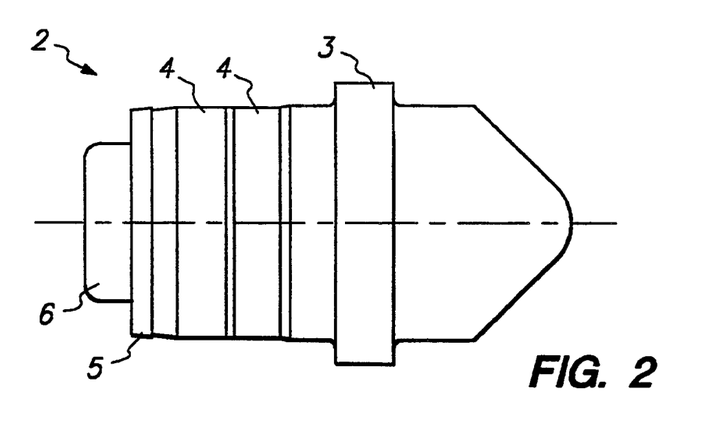
FIG. 2 shows a coupling member in accordance with the invention useful for capping an end of a plastic pipe.

FIGS. 1 and 2 show various configurations of the coupling member. In FIG. 1, the coupling member (1) can be used to join two pipe sections together whereas the coupling member (2) shown in FIG. 2 can be used for capping an end of a pipe. In either case, the coupling member includes a shoulder (3) for engaging an end of the ring, compression ribs (4) and a flange (5) for holding the ring in place on the coupling member. A space is provided between an inner surface of the coupling member and an outer surface of an insert (6) for receiving the plastic pipe.

Figure 3:
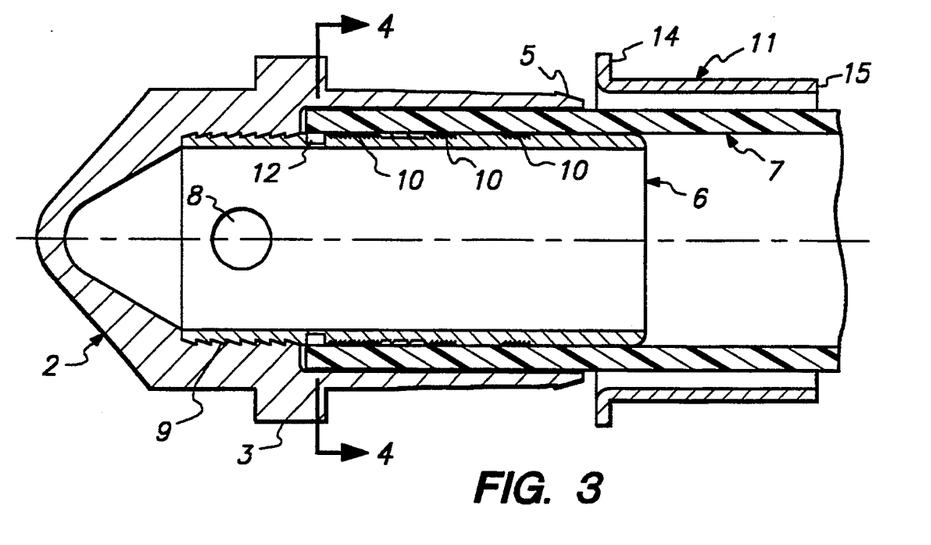
FIG. 3 shows an embodiment of a coupling device in accordance with the invention wherein spacer means comprises a groove in the outer surface of an insert member.
Figure 4:
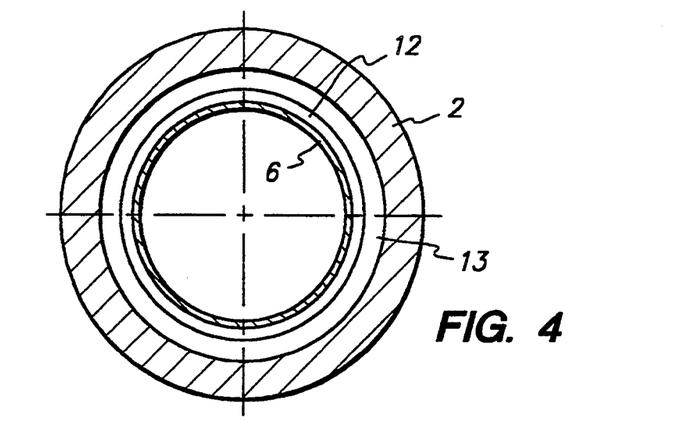
FIG. 4 shows a cross-section through the device of FIG. 3.

FIG. 3 shows one embodiment of the coupling device wherein the coupling member comprises a cap for capping an end of a plastic pipe (7). In this case, the coupling member (2) includes a hole (8) for accommodating part of the coupling member (2) when it is molded in place on the insert (6). The insert (6) also includes serrations (9) for mechanically locking the insert (6) to the coupling member (2) and serrations (10) for mechanically locking the insert (6) to the plastic pipe (7). A ring (11) is used to mechanically lock the pipe (7) to the insert (6) by compressing the ribs (4) on the outer surface of the coupling member (2) against the pipe (7) to cause plastic flow thereof whereby the serrations (10) extend into the inner surface of the pipe (7). Also shown in FIG. 3 is spacer means (12) for accommodating flow of the plastic pipe (7). In this case, the spacer means (12) comprises a circumferentially extending groove in an outer surface of the insert (6). FIG. 4 shows a cross-section taken along the line IV—IV in FIG. 3. In particular, FIG. 4 shows the coupling member (2), an annular space (13) for accommodating the pipe (7), the spacer means (12) and the insert (6). When the ring (11) is assembled on the coupling member (2), a flange (14) of the ring (11) engages the shoulder (3) of the coupling member (2) and the flange (5) of the coupling member (2) engages the opposite end (15) of the ring (11).

Figure 5:
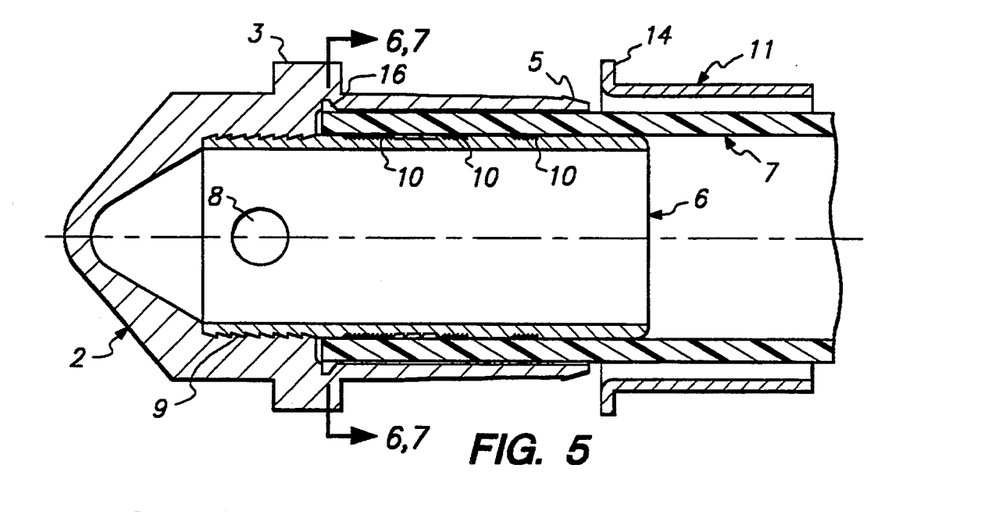
FIG. 5 shows another embodiment of the coupling device in accordance with the invention wherein the spacer means comprises a recess in an inner surface of the coupling member.
Figure 6:
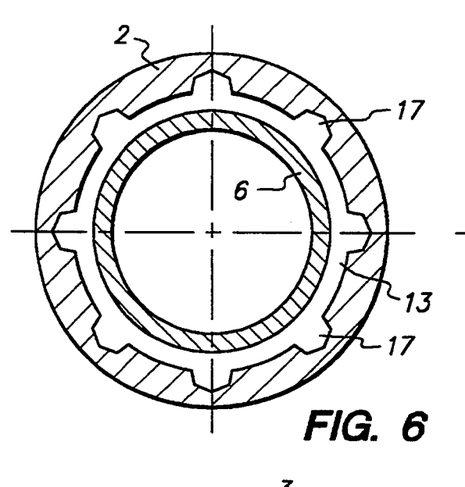
FIG. 6 shows a cross-section of the device shown in FIG. 5 wherein the recess comprises a plurality of depressions.
Figure 7:
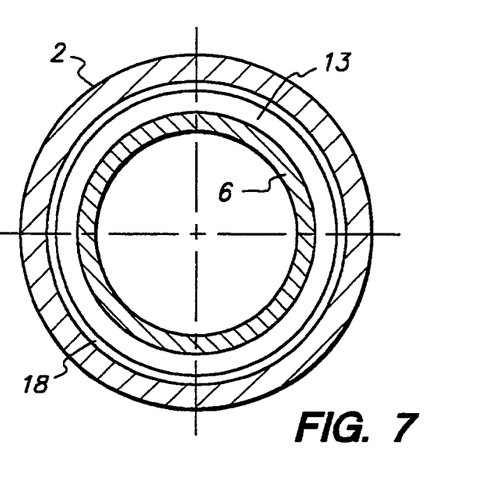
FIG. 7 shows a cross-section of the device shown in FIG. 5 wherein the recess comprises a continuous groove.
Figure 8:
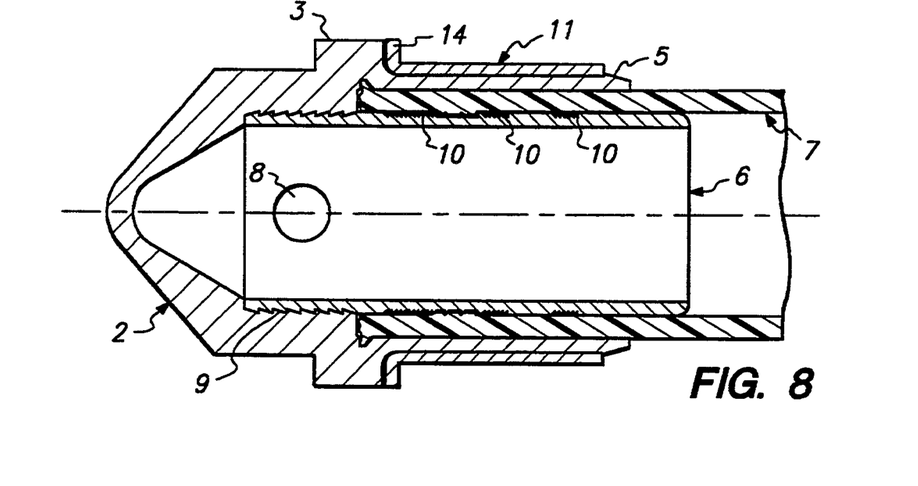
FIG. 8 shows the device of FIG. 5 in the assembled condition.

FIG. 5 shows another embodiment of the coupling device wherein the spacer means comprises a recess (16) in an inner surface of the coupling member (2). As shown in FIG. 6, the recess can be discontinuous and formed by a plurality of circumferentially spaced-apart depressions (17) in the inner periphery of the coupling member (2). Alternatively, the recess can be formed a continuous groove (18), as shown in FIG. 7. FIG. 8 shows the coupling device of FIG. 5 in the assembled condition.

Figure 9:
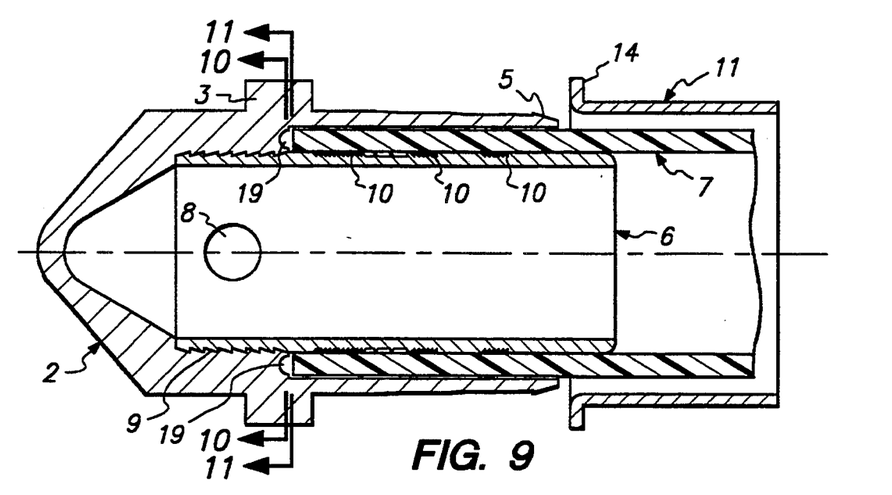
FIG. 9 shows another embodiment of the coupling device in accordance with the invention wherein the spacer means comprises a recess in an inner surface of the coupling member.
Figure 10:
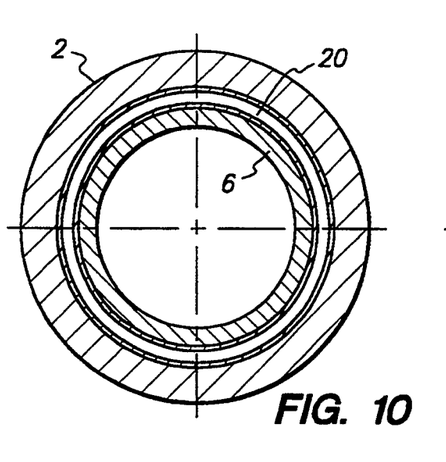
FIG. 10 shows a cross-section of the device in FIG. 9 wherein the recess comprises a continuous groove.
Figure 11:
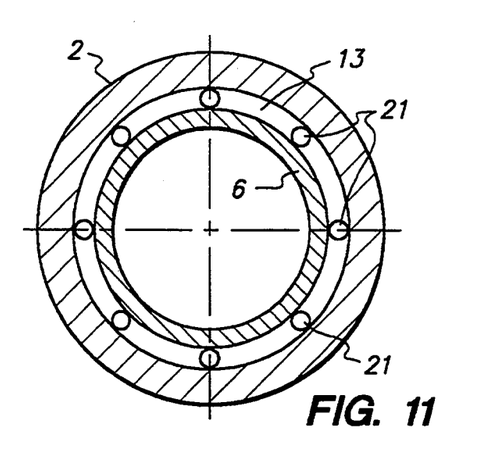
FIG. 11 shows a cross-section of the device of FIG. 9 wherein the recess comprises a plurality of depressions.

FIG. 9 shows another embodiment of the coupling device wherein the spacer means comprises an axially extending recess in the coupling member (2). As shown in FIG. 10, the recess can be formed by a continuous circumferentially extending groove (20). Alternatively, the recess can be formed by a plurality of circumferentially spaced-apart depressions (21), as shown in FIG.

Figure 12:
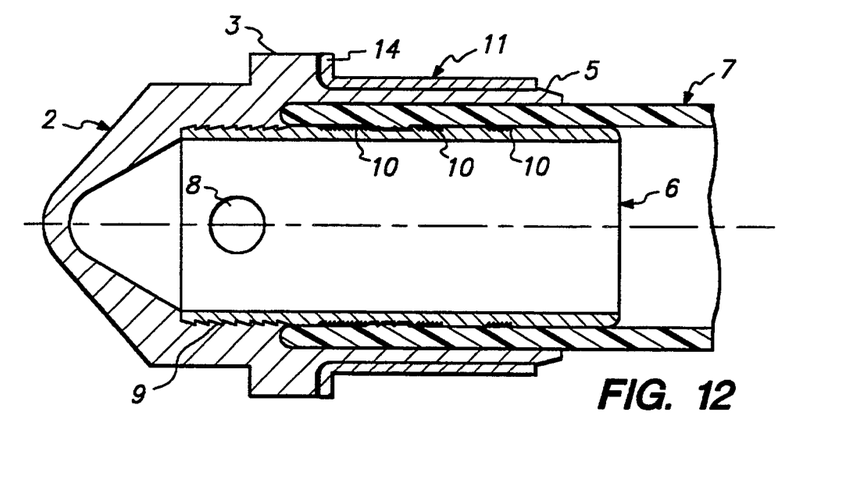
FIG. 12 shows the device of FIG. 9 in the assembled condition.

11. FIG. 12 shows the device of FIG. 9 in the assembled condition.

Figure 13:
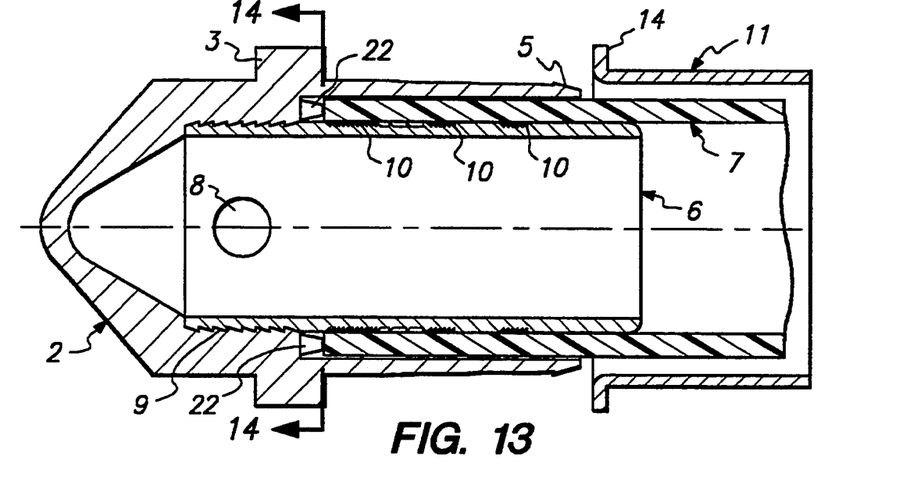
FIG. 13 shows another embodiment of the coupling device in accordance with the invention wherein the spacer means comprises two tapered projections on an inner surface of the coupling member.
Figure 14:
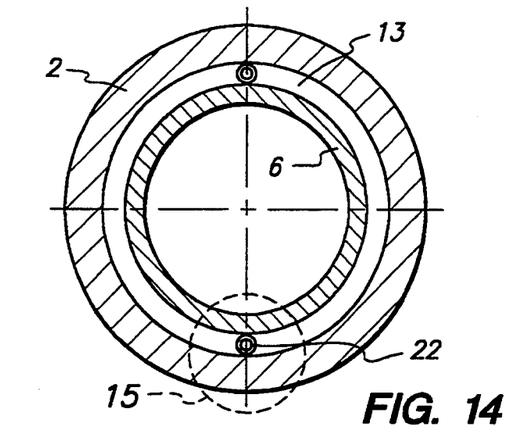
FIG. 14 shows a cross-section of the device of FIG. 13.
Figure 15:
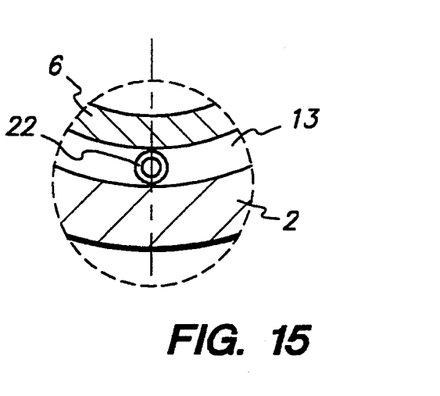
FIG. 15 shows a detail from FIG. 14.
Figure 16:
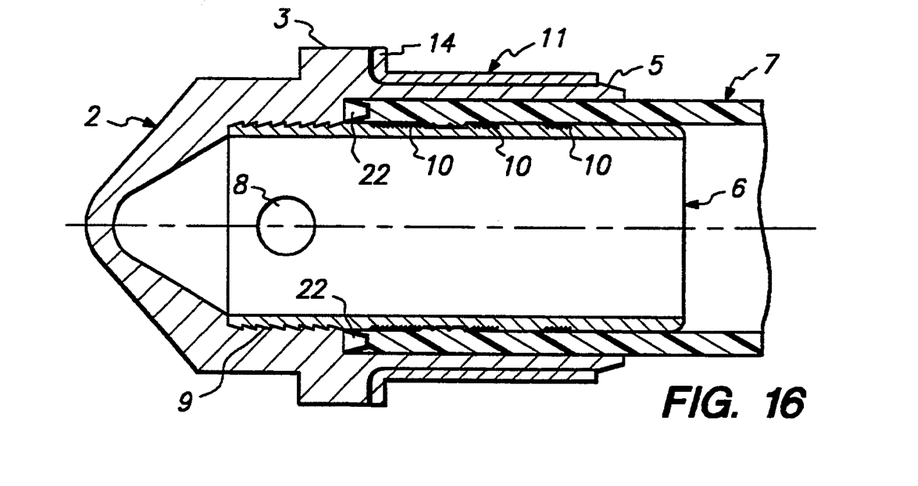
FIG. 16 shows the device of FIG. 13 in the assembled condition.

FIG. 13 shows another embodiment of the coupling device in accordance with the invention wherein the spacer means comprises one or more tapered, axially extending projections (22). FIG. 14 shows a cross-section of the device of FIG. 13 wherein the spacer means comprises two diametrically opposed projections (22). FIG. 15 is an enlargement of a detail XV of FIG. 14. FIG. 16 shows the device of FIG. 13 in the assembled condition.

Figure 17:
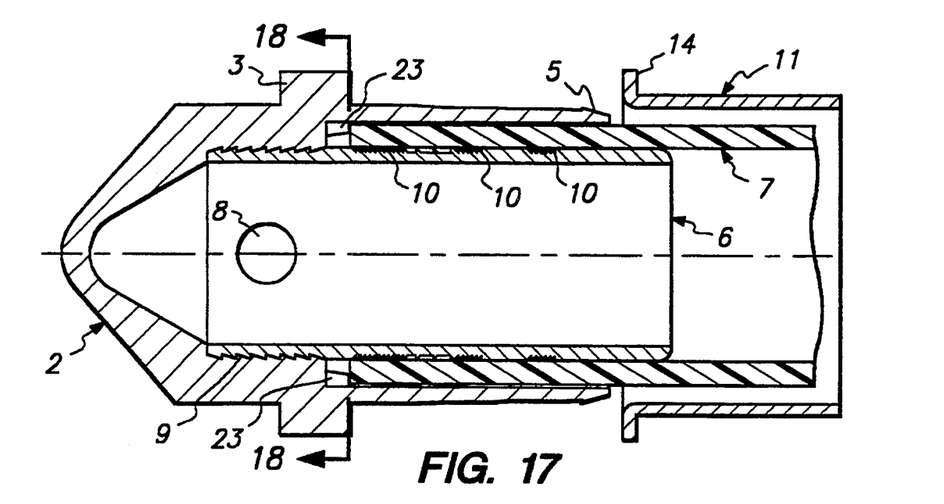
FIG. 17 shows another embodiment of the coupling device in accordance with the invention wherein the spacer means comprises two semicircular projections on an inner surface of the coupling member.
Figure 18:
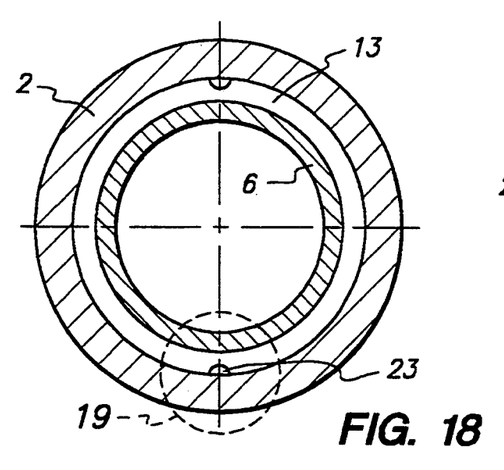
FIG. 18 shows a cross-section of the device of FIG. 17.
Figure 19:
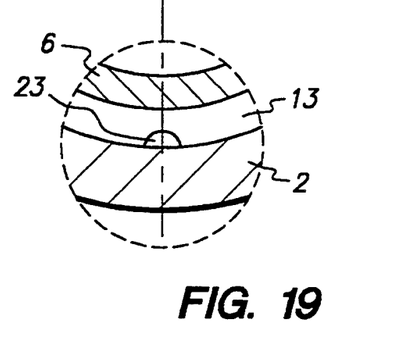
FIG. 19 shows a detail from FIG. 18.
Figure 20:
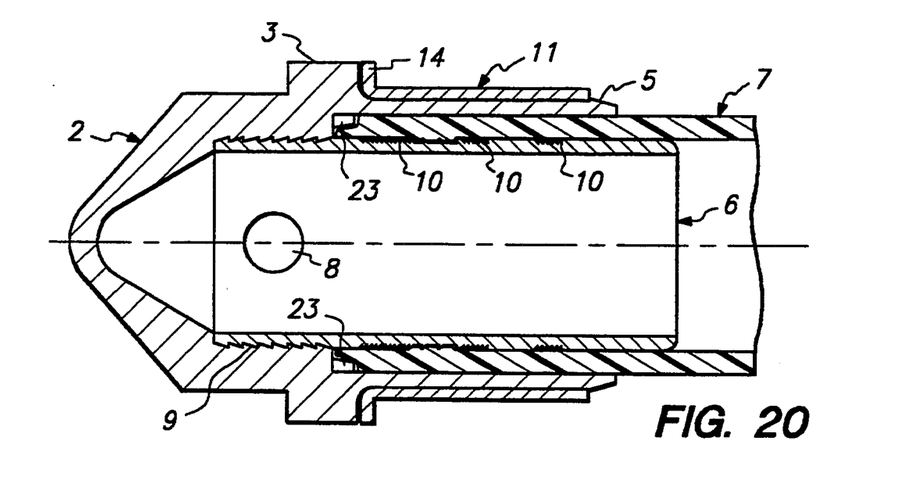
FIG. 20 shows the device of FIG. 17 in the assembled condition.

FIG. 17 shows another embodiment of the coupling device in accordance with the invention wherein the spacer means comprises one or more radially extending projections (23). As shown in the cross-sectional view of FIG. 18, the projections (23) can comprise semi-circular bumps extending radially inwardly from an inner surface of the coupling member (2). FIG. 19 shows an enlarged view of detail XIX of FIG. 18. FIG. 20 shows the device of FIG. 17 in the assembled condition.

Figure 21:
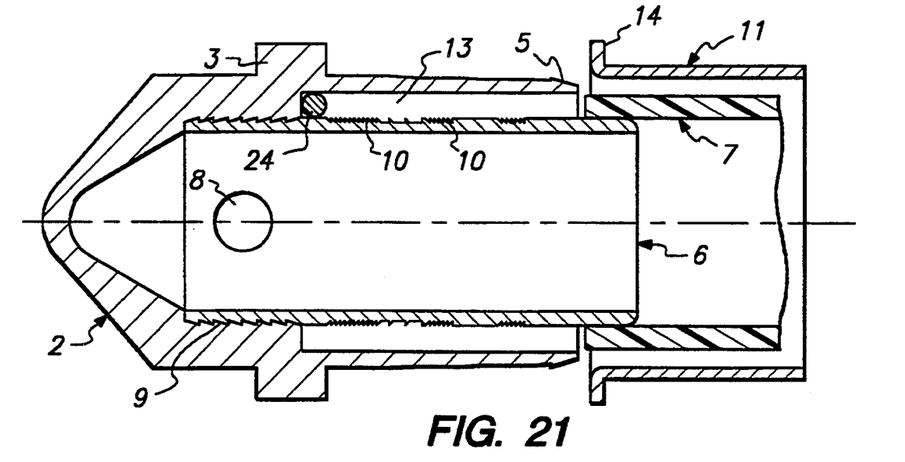
FIG. 21 shows a further embodiment of the coupling device in accordance with the invention wherein the spacer means comprises a ball bearing.

FIG. 21 shows another embodiment of the coupling device in accordance with the invention wherein the spacer means comprises at least one ball bearing (24). As shown in FIG. 21, the ball bearing is inserted in the space (13). The ball bearing (24) creates a space which accommodates flow of the plastic pipe (7) when the ring (11) is slid into place over the outer surface of the coupling member (2).

Figure 22:
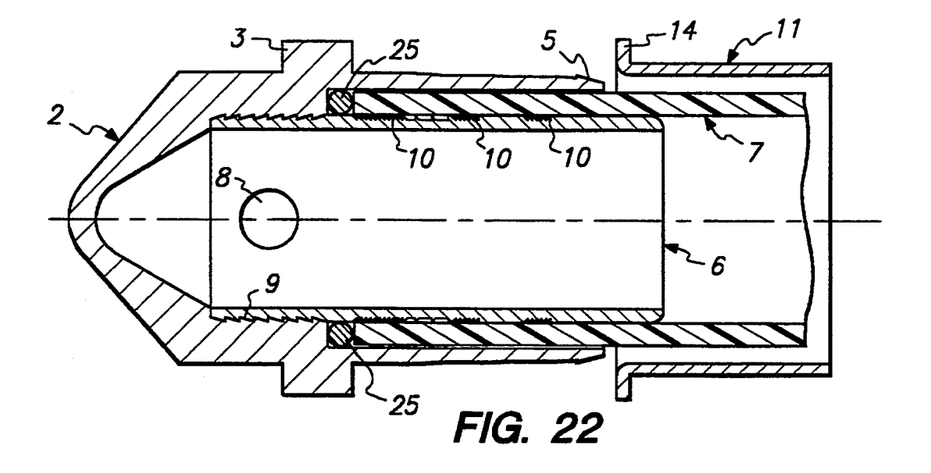
FIG. 22 shows a further embodiment of the coupling device in accordance with the invention wherein the spacer means comprises a compressible member.

FIG. 22 shows another embodiment of the coupling device in accordance with the invention wherein the spacer means comprises a compressible member (25). The compressible member (25) can be any deformable material or device which stops the plastic pipe (7) insertion by hand but which allows the plastic pipe (7) to elongate when the ring (11) is forced in place by a tool (not shown).

Figure 23:
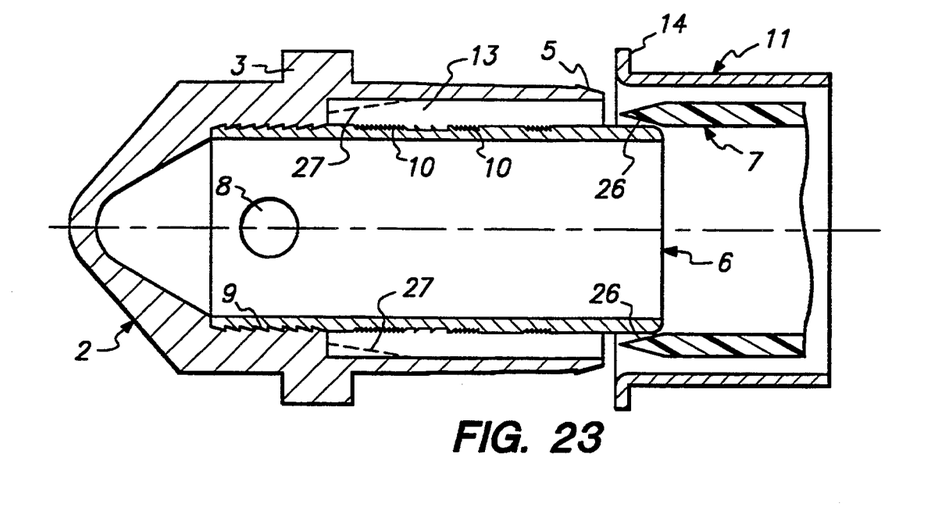
FIG. 23 shows two embodiments of the coupling device in accordance with the invention wherein the spacer means comprises a tapered end of the plastic pipe or a tapered inner surface (in phantom lines) of the coupling member.

FIG. 23 shows yet another embodiment of the coupling device of the invention wherein the spacer means comprises a tapered end surface (26) of the plastic pipe (7). The tapered surface (26) allows the end of the plastic pipe (7) to be plastically deformed and flow into the open space surrounding the tapered surface when the ring (11) is assembled onto the coupling member (2). The spacer means could also comprise a tapered inner surface (27) of the coupling member (2), as shown in phantom lines in FIG. 23. It can be seen from FIG. 23 that a plastic pipe will contact such a tapered surface (27) when the plastic pipe is inserted by hand but will allow plastic deformation and flow of the plastic pipe when the ring (11) is assembled onto the coupling member (2).

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A coupling device useful for capping an end of a plastic pipe or joining two or more plastic pipes in fluid communication with each other, comprising:

an insert adapted for insertion into an end of a plastic pipe, the insert including means on an outer surface thereof for mechanically interlocking with an inner surface of the plastic pipe;

coupling means for surrounding the end of the plastic pipe and overlying the insert;

a ring having a smaller inner diameter than the outer diameter of the coupling means, the ring being adapted to fit over the coupling means and press the plastic pipe between the coupling means and the insert; and spacer means for allowing plastic flow of the end of the plastic pipe when the ring is fitted over the coupling means.

2. The coupling device of claim 1, wherein the coupling means comprises a cup shaped tubular member which is open only at one end and sealed at an opposite end thereof.

3. The coupling device of claim 1, wherein the coupling means comprises a tube which is open at opposite ends thereof with an axially extending continuous passageway extending between the opposite ends.

4. The coupling device of claim 1, wherein the spacer means comprises a recess in an outer surface of the insert.

5. The coupling device of claim 1, wherein the spacer means comprises a recess on an inner surface of the coupling means.

6. The coupling device of claim 5, wherein the recess comprises a continuous groove on the inner surface of the coupling means.

7. The coupling device of claim 5, wherein the recess comprises a plurality of depressions on the inner surface of the coupling means.

8. The coupling device of claim 1, further comprising a plastic pipe having an end thereof in a space between an outer surface of the insert and an inner surface of the coupling means, the spacer means comprising a tapered surface of the end of the plastic pipe.

9. A coupling device useful for capping an end of a plastic pipe or joining two or more plastic pipes in fluid communication with each other, comprising:

an insert adapted for insertion into an end of a plastic pipe, the insert including means on an outer surface thereof for mechanically interlocking with an inner surface of the plastic pipe;

coupling means for surrounding the end of the plastic pipe and overlying the insert;

a ring having a smaller inner diameter than the outer diameter of the coupling means, the ring being adapted to fit over the coupling means and press the plastic pipe between the coupling means and the insert; and spacer means for allowing plastic flow of the end of the plastic pipe when the ring is fitted over the coupling means, the spacer means comprising a projection on an inner surface of the coupling means.

10. The coupling device of claim 9, wherein the projection is tapered in shape.

11. The coupling device of claim 9, wherein the projection is semi-circular in shape.

12. A coupling device useful for capping an end of a plastic pipe or joining two or more plastic pipes in fluid communication with each other, comprising:

an insert adapted for insertion into an end of a plastic pipe, the insert including means on an outer surface thereof for mechanically interlocking with an inner surface of the plastic pipe;

coupling means for surrounding the end of the plastic pipe and overlying the insert;

a ring having a smaller inner diameter than the outer diameter of the coupling means, the ring being adapted to fit over the coupling means and press the plastic pipe between the coupling means and the insert; and spacer means for allowing plastic flow of the end of the plastic pipe when the ring is fitted over the coupling means, the spacer means comprising a ball bearing adapted to fit between the outer surface of the insert and an inner surface of the coupling means.

13. A coupling device useful for capping an end of a plastic pipe or joining two or more plastic pipes in fluid communication with each other, comprising:

an insert adapted for insertion into an end of a plastic pipe, the insert including means on an outer surface thereof for mechanically interlocking with an inner surface of the plastic pipe;

coupling means for surrounding the end of the plastic pipe and overlying the insert;

a ring having a smaller inner diameter than the outer diameter of the coupling means, the ring being adapted to fit over the coupling means and press the plastic pipe between the coupling means and the insert; and spacer means for allowing plastic flow of the end of the plastic pipe when the ring is fitted over the coupling means, the spacer means comprising a compressible member.

14. A coupling device useful for capping an end of a plastic pipe or joining two or more plastic pipes in fluid communication with each other, comprising:

an insert adapted for insertion into an end of a plastic pipe, the insert including means on an outer surface thereof for mechanically interlocking with an inner surface of the plastic pipe;

coupling means for surrounding the end of the plastic pipe and overlying the insert;

a ring having a smaller inner diameter than the outer diameter of the coupling means, the ring being adapted to fit over the coupling means and press the plastic pipe between the coupling means and the insert; and spacer means for allowing plastic flow of the end of the plastic pipe when the ring is fitted over the coupling means, the spacer means comprising a tapered inner surface of the coupling means, part of the tapered surface having a diameter smaller than an outer diameter of the end of the plastic pipe.

15. A coupling device useful for joining two or more plastic pipes together, comprising:

an insert member having sections thereof adapted for fitting within open ends of plastic pipes; said sections having serrations thereon;

a coupling member adapted to be placed in encircling relation over the sections of the insert member and the pipe ends and form an annular space between each section of the insert and a corresponding portion of the coupling member for slidingly receiving a respective one of the pipe ends;

rigid rings having passageways therethrough, each passageway being smaller in diameter than a mating portion of the coupling member, the rings being adapted to be slid on the coupling member whereby said serrations on the insert member are compressibly engaged with the interior surfaces of the plastic pipes and the pipes are coupled to the insert member, the coupling member and the rings; and spacer means for allowing plastic flow of the ends of the plastic pipes when the rings are fitted over the coupling member.

16. The coupling device of claim 15, wherein the spacer means comprises recesses in outer surfaces of the insert.

17. The coupling device of claim 15, wherein the spacer means comprises recesses on inner surfaces of the coupling member.

18. The coupling device of claim 17, wherein the recesses comprise continuous grooves on inner surfaces of the coupling member.

19. The coupling device of claim 17, wherein the recesses comprise depressions on inner surfaces of the coupling member.

20. The coupling device of claim 15, wherein the coupling device further comprising plastic pipes each of which has an end thereof in the annular space between the insert and the coupling member and the spacer means comprises tapered surfaces of the ends of the plastic pipes.

21. A coupling device useful for joining two or more plastic pipes together, comprising:

an insert member having sections thereof adapted for fitting within open ends of plastic pipes; said sections having serrations thereon;

a coupling member adapted to be placed in encircling relation over the sections of the insert member and the pipe ends and form an annular space between each section of the insert and a corresponding portion of the coupling member for slidingly receiving a respective one of the pipe ends;

rigid rings having passageways therethrough, each passageway being smaller in diameter than a mating portion of the coupling member, the rings being adapted to be slid on the coupling member whereby said serrations on the insert member are compressibly engaged with the interior surfaces of the plastic pipes and the pipes are coupled to the insert member, the coupling member and the rings; and spacer means for allowing plastic flow of the ends of the plastic pipes when the rings are fitted over the coupling member, the spacer means comprising projections on inner surfaces of the coupling member.

22. The coupling device of claim 21, wherein the projections are tapered in shape.

23. The coupling device of claim 21, wherein the projections are semi-circular in shape.

24. A coupling device useful for joining two or more plastic pipes together, comprising:

an insert member having sections thereof adapted for fitting within open ends of plastic pipes; said sections having serrations thereon;

a coupling member adapted to be placed in encircling relation over the sections of the insert member and the pipe ends and form an annular space between each section of the insert and a corresponding portion of the coupling member for slidingly receiving a respective one of the pipe ends;

rigid rings having passageways therethrough, each passageway being smaller in diameter than a mating portion of the coupling member, the rings being adapted to be slid on the coupling member whereby said serrations on the insert member are compressibly engaged with the interior surfaces of the plastic pipes and the pipes are coupled to the insert member, the coupling member and the rings; and spacer means for allowing plastic flow of the ends of the plastic pipes when the rings are fitted over the coupling member, the spacer means comprising ball bearings which fit between outer surfaces of the insert and inner surfaces of the coupling member.

25. A coupling device useful for joining two or more plastic pipes together, comprising:

an insert member having sections thereof adapted for fitting within open ends of plastic pipes; said sections having serrations thereon;

a coupling member adapted to be placed in encircling relation over the sections of the insert member and the pipe ends and form an annular space between each section of the insert and a corresponding portion of the coupling member for slidingly receiving a respective one of the pipe ends;

rigid rings having passageways therethrough, each passageway being smaller in diameter than a mating portion of the coupling member, the rings being adapted to be slid on the coupling member whereby said serrations on the insert member are compressibly engaged with the interior surfaces of the plastic pipes and the pipes are coupled to the insert member, the coupling member and the rings; and spacer means for allowing plastic flow of the ends of the plastic pipes when the rings are fitted over the coupling member, the spacer means comprising a compressible member.

26. A coupling device useful for joining two or more plastic pipes together, comprising:

an insert member having sections thereof adapted for fitting within open ends of plastic pipes; said sections having serrations thereon;

a coupling member adapted to be placed in encircling relation over the sections of the insert member and the pipe ends and form an annular space between each section of the insert and a corresponding portion of the coupling member for slidingly receiving a respective one of the pipe ends;

rigid rings having passageways therethrough, each passageway being smaller in diameter than a matting portion of the coupling member, the rings being adapted to the slid on the coupling member whereby said serrations on the insert member are compressibly engaged with the interior surfaces of the plastic pipes and the pipes are coupled to the insert member, the coupling member and the rings; and spacer means for allowing plastic flow of the ends of the plastic pipes when the rings are fitted over the coupling member, the space means comprising a tapered inner surface of the coupling member.

* * * * *